United States Patent [19]

Holtz

[11] Patent Number: 4,616,756
[45] Date of Patent: Oct. 14, 1986

[54] READILY ASSEMBLED TWO-SHELF CART

[76] Inventor: Gilbert J. Holtz, 188 Tibbetts Rd., Yonkers, N.Y. 10705

[21] Appl. No.: 604,240

[22] Filed: Apr. 26, 1984

[51] Int. Cl.$^4$ ............................................. A47F 5/01
[52] U.S. Cl. .................................. 211/181; 211/189; 248/188.8; 280/47.35
[58] Field of Search ............... 211/181, 189, 133, 132; 280/79.3, 47.34, 47.35; 248/188.9, 188.8

[56] References Cited

U.S. PATENT DOCUMENTS

| 2,583,514 | 1/1952 | Maslow | 280/47.35 X |
| 3,037,786 | 6/1962 | Shackel | 280/47.35 |
| 3,387,855 | 6/1968 | Oliver | 211/181 X |
| 3,589,746 | 6/1971 | Inglis et al. | 280/79.3 |
| 4,459,920 | 7/1984 | Cwik | 248/188.8 X |

Primary Examiner—Robert W. Gibson, Jr.
Attorney, Agent, or Firm—Bauer & Amer

[57] ABSTRACT

A readily assembled cart for storing and receiving fan-folded computer paper having a frame formed of a lower shelf and a pair of side walls connected to the lower shelf at each of its corners by a removable caster assembly. An upper shelf is removably hooked onto the inner surfaces of the side walls above the lower shelf, and transverse end walls connected to the side walls to secure the side walls against lateral deflection.

3 Claims, 5 Drawing Figures

READILY ASSEMBLED TWO-SHELF CART

The present invention relates generally to a movable cart for fan-folded blank and imprinted paper for use in conjunction with a computer, and more particularly to an easily erectable cart having two horizontal supports; one for the blank paper supply and one for the processed paper.

Shelf carts for use with computers, wherein the cart has one support to hold a blank supply of paper and a second support to receive the imprinted result, are in common use. However, because of the weight of fan-folded computer paper, the carts are generally heavy, permanently constructed pieces of furniture, which are expensive to manufacture, store and ship.

Broadly, it is an object of the present invention to provide a simple, lightweight knock-down cart for storing the paper and controlling the flow thereof during the production of a computer printout, which overcomes the disadvantages of the prior art. Specifically, it is an object to provide a movable cart having separate shelves for the blank and imprinted paper formed of a wire form rack element, which provides such advantages as economical cost, and sturdy, simple construction.

According to the present invention a movable cart is provided comprising a first lower shelf having at each corner an eyelet extending outwardly to each side in the plane of the support. A pair of side walls are provided, each having at their lower corners an eyelet extending inwardly perpendicular to the plane of the side wall and in registry with a corresponding pair of side eyelets of the lower shelf. The eyelets are joined, on the axle of a caster, by suitable nuts or bolts to form a generally U-shaped frame. A second upper shelf is connected adjacent the upper edge of the side walls by providing the side walls with hooks on which the upper shelf can be removably supported. Lastly, a pair of end walls each provided with hooks on the lower edge to engage the upper shelf, and a transverse bar having eyelets at each end to engage with extensions on the upper edge of each of the side walls, secures the assembly in fixed position. The fixed engagement holds the side walls in spaced vertical relation to each other and the upper and lower shelves in horizontal spaced operative position, such that the cart provides two shelves for separately supporting the blank and imprinted paper, respectively.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawigs, wherein.

Figure 1:
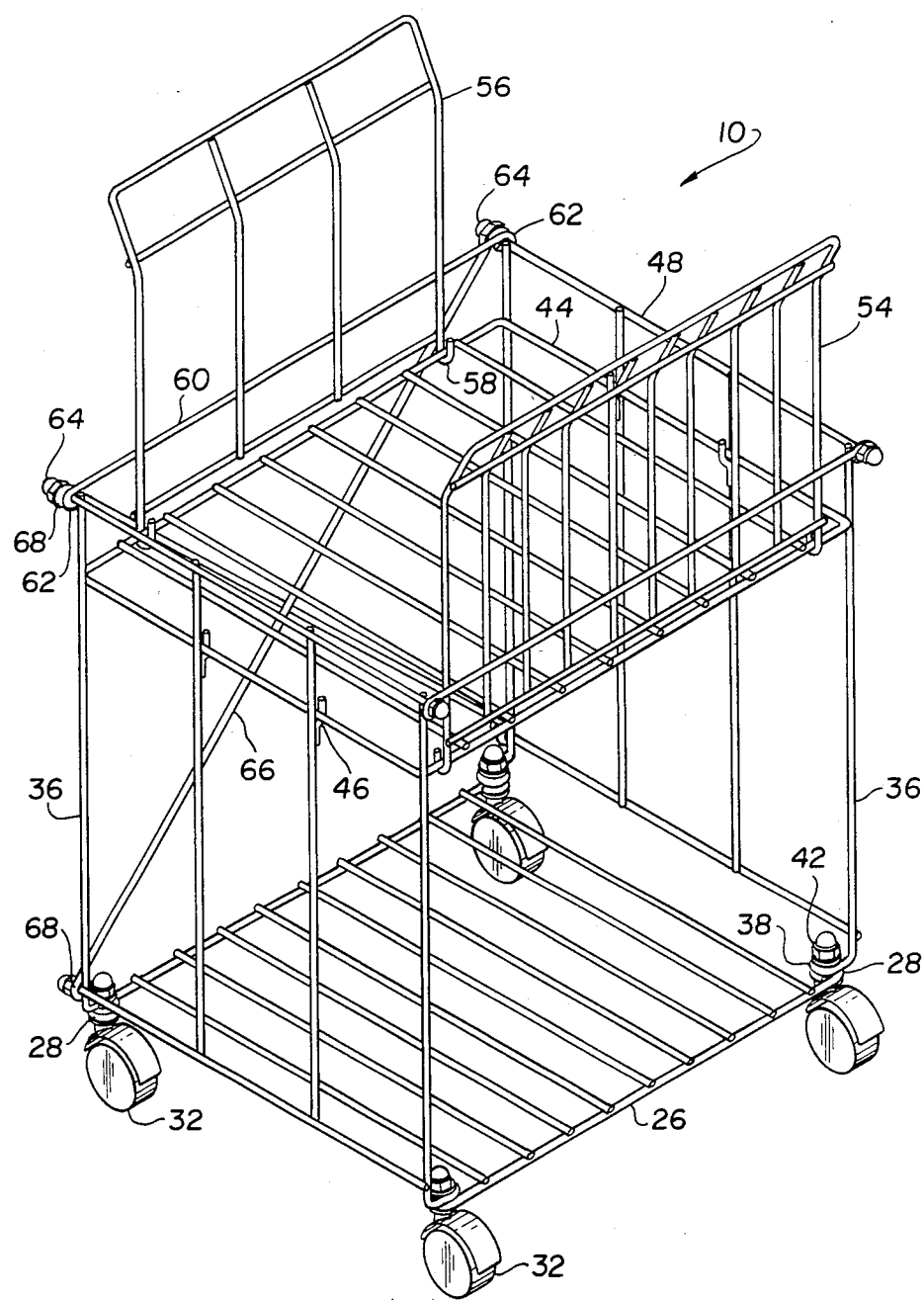
FIG. 1 is a perspective view of the cart according to the present invention.
Figure 2:
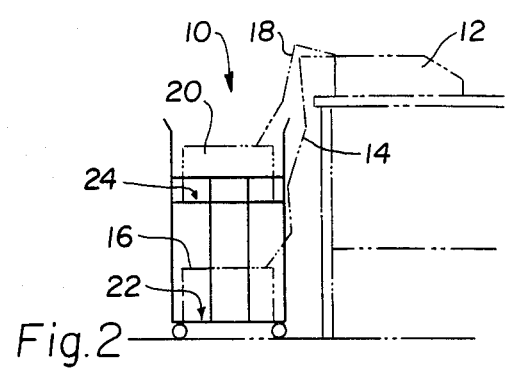
FIG. 2 is a side elevational view illustrating the manner in which the cart is used in conjunction with the computer printout.
Figure 4:
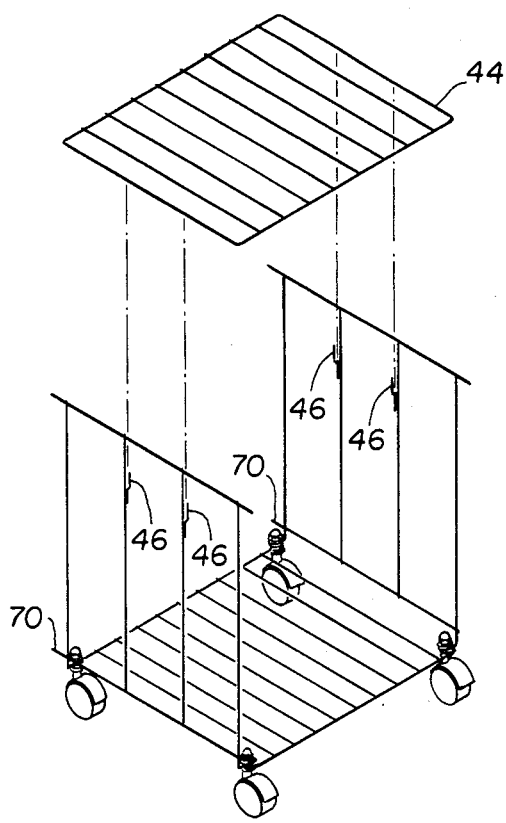
FIG. 4 is a view similar to FIG. 3, showing the addition of the upper shelf.
Figure 3:
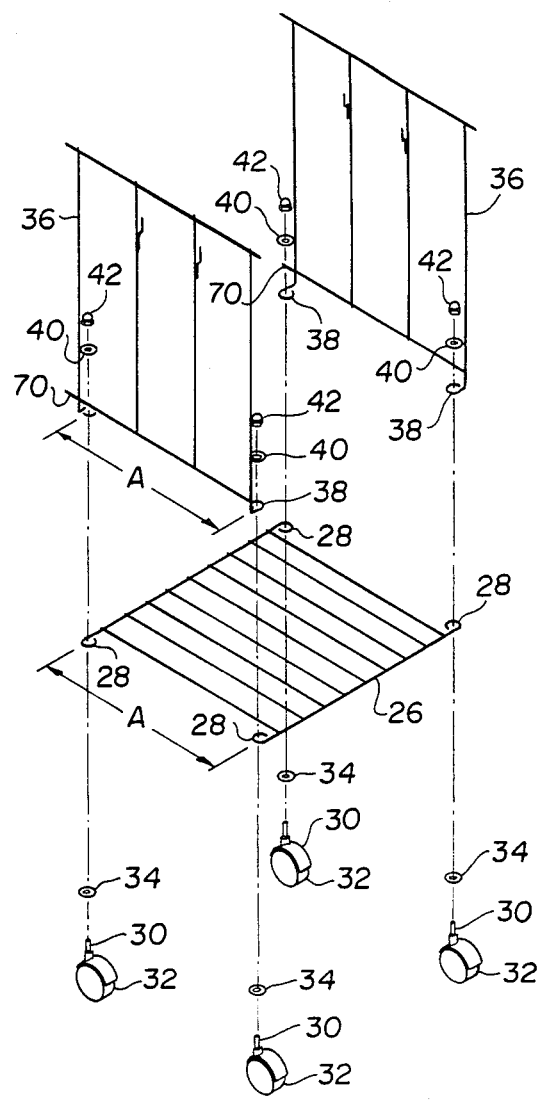
FIG. 3 is an exploded view of the lower shelf, casters, and side walls, illustrating the first step in the assembly of the cart of the present invention.
Figure 5:
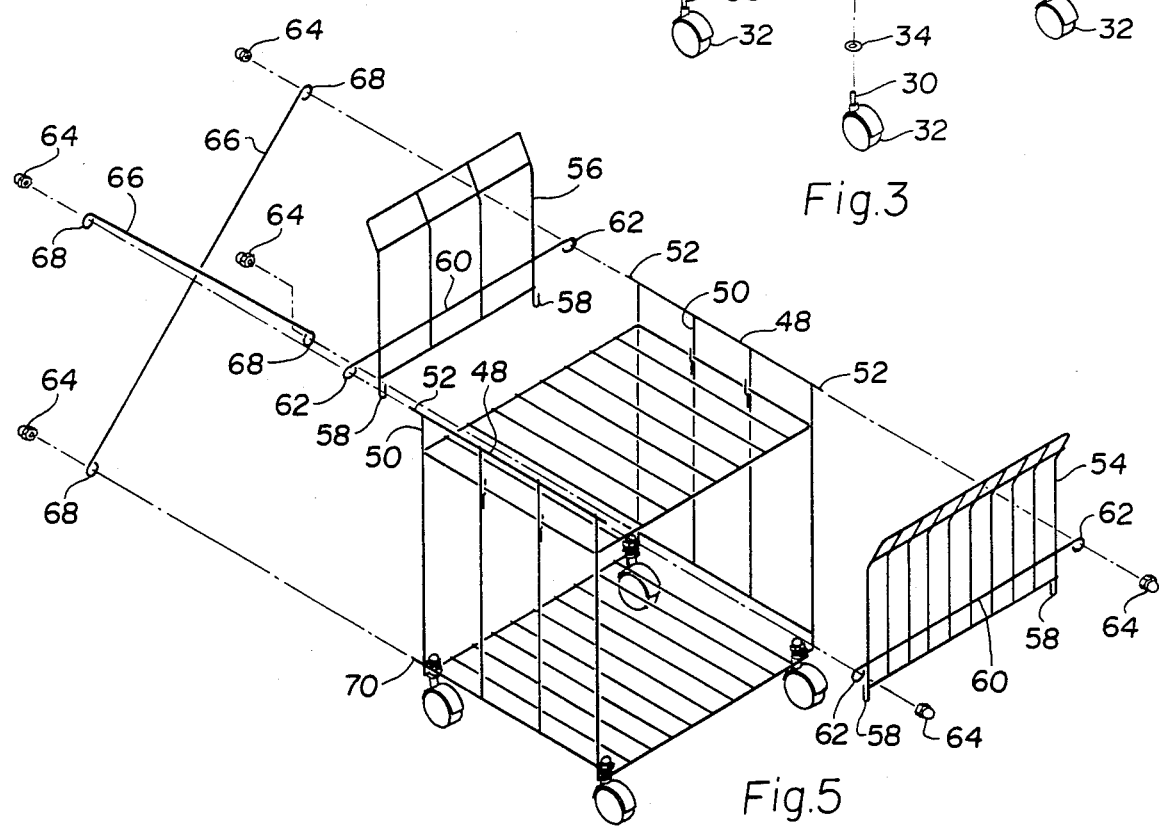
FIG. 5 is a view similar to FIGS. 3 and 4 illustrating the completion of the cart with the upper retaining wall sections.

Before describing in detail the structural features of the inventive cart, it is helpful to note that as best illustrated in FIG. 2, the cart, generally designated 10, is useful as an accessory for a computer printer 12 during which a supply length 14 of fan-folded blank paper 16, is fed to the printer 12 and exits therefrom in imprinted condition as illustrated by reference number 18, and is stored as a computer printout 20, for subsequent study and other use. Thus, the cart 10, is required to have two shelves; one for the blank paper 16, and the other for the printed paper 20. As will be subsequently explained herein in detail, the cart 10 provides a lower shelf 22 serving as a support for the blank supply 16, and an upper shelf 24 for the stored computer printout 20.

As seen in the figures, the cart is shown made of wire form elements (i.e., wire rods, welded or otherwise integrally formed in open rack framework). The cart 10 as seen in FIGS. 1 and 3 to 5 includes a lower horizontal shelf 26 having extending from each of its corners in mirror image relationship and in the plane of the shelf four eyelet fittings 28 into each of which is fit the axle 30 of a caster 32. Suitable washers 34 fit about the axle 30 separating the caster from the eyelet permitting free swivelling of the caster.

Cooperating with the shelf 26 to provide a U-shaped frame are a pair of vertical side walls 36, each of which having, at their corners adjacent the lower edge, an eyelet fitting 38, which extends perpendicular to the plane of the respective side wall 36. The lower shelf and the side walls have conforming dimensions in the direction A so that the eyelets 38 of each side walls can be placed over the axles 30 of the corresponding casters in registry with the eyelets 28 of the lower shelf. The side walls and the lower shelf are clamped together to form a fixed unitary connection by the use of suitable retaining washer 40 and an acorn nut 42 removably secured to the respective axles 30. At this point it is helpful to note that this form of engagement has two significant results. First, it holds the lower shelf 26 horizontal and the side walls vertical in extended perpendicular relation to each other, so that the side walls may serve as a vertical support for an upper shelf 44, as well as providing a basically rigid structure.

To support the upper shelf 44, each of the side walls are provided with a plurality of spaced upwardly open hooks 46 over which opposite side edges of the upper shelf enter and engage. The opening or space in each hook 46 is relatively small and the length of the hook is relatively long so that a resilient clamping of the upper shelf to the side walls is effected. Of course, the hooks are arranged so that the upper shelf 44 lies parallel to the lower shelf in a horizontal plane. To release the upper shelf 44 from its operative position so that it can assume a compact storage condition, it is merely necessary to pull the shelf upward from hooks 46.

The hooks 46 are preferably arranged below the top edge 48 of the side walls 36, so that a lip 50 of considerable depth is provided. The lip 50 forms a retaining wall preventing spillage of paper from the sides of the upper shelf. Extending fore and aft from each end of the edges 48, in the plane of the sides walls, are rod extensions 52.

To assist in properly functioning as a shelf supporting and directing the imprinted paper which exits from the printing device 12, the cart is provided with forward and aft wall sections 54 and 56. Each wall section 54 and 56 is provided with an open hook 58 at each of its lower corners and a transverse bar 60 which extends outwardly at each end in the form of an eyelet fitting 62.

The eyelet fittings 62 are spaced vertically from the hooks 58 a distance equal to the height of lip 50 so that the hooks 58 in the respective fore and aft wall sections can engage beneath the front and rear edges of the upper shelf 44 while the eyelets 62 fit over the extending rods 48. The fore and aft walls 54 and 56 can thus be secured to the side walls by acorn nuts 64 and in this condition act not only to support the upper shelf, but brace the side walls against lateral deflection. A unitary sturdy but collapsible cart is thus formed.

For increased rigidity, if desired, one or more braces 66 each having eyelets 68 at their ends may be secured beneath the acorn nuts 64 at the rear of the cart. To effect this the side walls 36 must be provided with a rod extension 70 extending from each of its lower rear corners.

Preferably, the upper edge of the fore and aft wall sections are bent slightly outwardly to assist in the movement of paper. Also, one of the fore and aft wall sections may be made taller than the other.

From what has been described, it should be readily appreciated that cart 10 is particularly useful in serving as a support for the supply of paper for a computer, as well as for its printout, since it provides in two locations, namely, on the lower shelf 26 and on the upper shelf 44, stations at which lengths of paper can be supported. The cart is sturdy and easily movable.

The cart as illustrated and described is seen to be easily "knocked-down" or storage, and shipment. Thus, the parts are separable, and planar, thereby being easily packaged in a flat carton or the like. It is easily erectable, requiring virtually no tools to do so. Further, the form of wire rack shown, wherein the rack itself comprises peripheral edge rods to which are welded a plurality of parallel spaced rods has the advantage of great strength in all directions but above all the ability of allowing the elements to be easily hooked, or fastened together. However, while the cart is shown formed of wire-formed frame or rack-like elements, the elements may be in whole or in part of other forms and other materials, such as plastic.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A readily assembled two-shelf cart adapted in said assembled condition to store and receive fan-folded computer paper comprising, in combination, a rectangular horizontally oriented lower shelf having an extending eyelet at each corner for supporting a shelf for said fan-folded computer paper thereon, a pair of vertically oriented side walls each having inwardly extending eyelets at opposite ends along their bottom edge in aligning relation to said eyelets of said lower shelf, casters at each corner of said cart each having an upstanding axle adapted to be secured in a projected relation through said aligning eyelets of said lower shelf and side walls for partially completing the assembly of said cart, and hook means provided inwardly of each of said side walls and an upper shelf engaged therein so as to be supported in spanning relation between said side walls, whereby the engagement of said upper shelf between said side walls completes the assembly of said cart and provides a support for said computer paper after the imprinting thereof.

2. The two-shelf cart as claimed in claim 1 wherein said upper shelf is engaged a selected distance below the upper edge of said side walls, to thereby provide retaining edges for the paper being supported thereon.

3. The two-shelf cart as claimed in claim 2 wherein the upper edges of said side walls are oversized to provide extensions in opposite directions therefrom, and said cart includes a front and a rear wall connected to said side wall extensions in spanning relation therebetween, to thereby provide additional retaining edges for the paper being supported thereon.

* * * * *